April 18, 1933.   J. BENZ   1,904,714
BUTTER AND LIKE MOLDING DEVICE
Filed Nov. 4, 1931
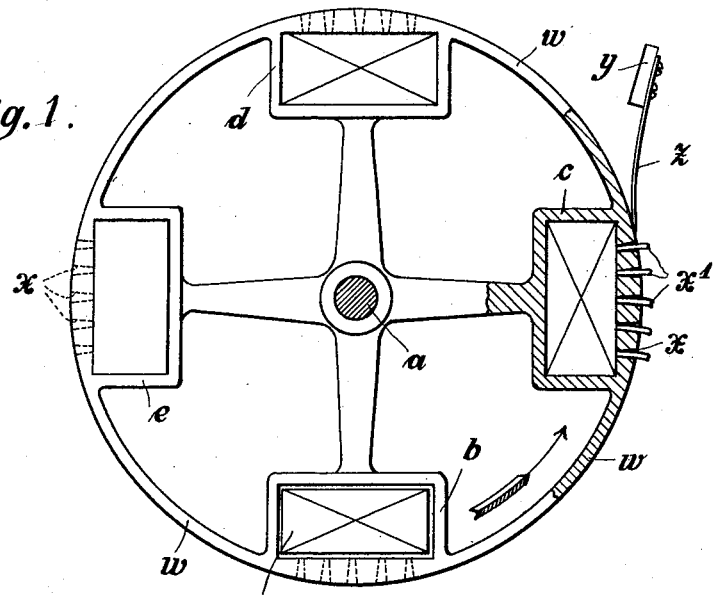
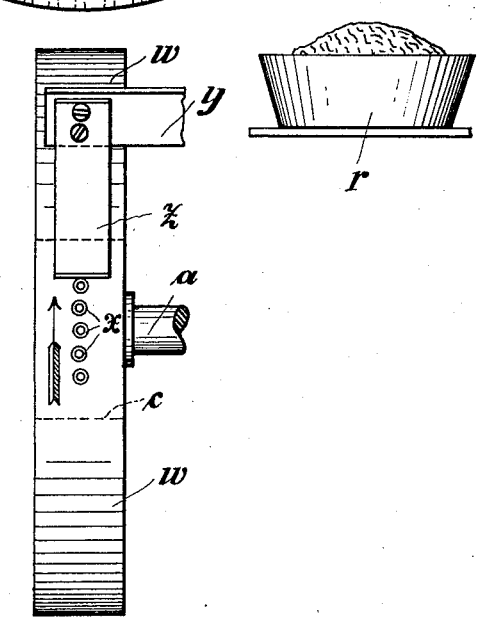
Inventor:
Johannes Benz.

Patented Apr. 18, 1933

1,904,714

UNITED STATES PATENT OFFICE

JOHANNES BENZ, OF DUSSELDORF, GERMANY

BUTTER AND LIKE MOLDING DEVICE

Application filed November 4, 1931. Serial No. 572,960.

This invention is an improvement in or modification of a device which is described and claimed in a co-pending application and which consists of a plurality of open-ended molds into which butter or the like is fed and wherein it is pressed between opposing press plungers into portions of definite shape and weight, means being provided for discharging from the molds any material not containable between the plungers.

According to the above application, the discharge of excessive material is effected through apertures made in one of the opposing press plungers.

According to the present invention, the molds are mounted inside the rim of a wheel, and the discharge of excessive material from the molds is effected through apertures made in the rim, a scraper being provided which bears against the rim for detaching the extruded material from the latter.

Fig. 1 of the accompanying drawing represents a front view of the improved device, partly in section, and Fig. 2 is a view at right angles to Fig. 1.

The improved device comprises a wheel having a smooth rim $w$ and containing within said rim a plurality of open-ended molds $b$, $c$, $d$ and $e$. The rim is provided with apertures $x$ through which materials can be extruded from the molds, and a scraper $z$, connected to a holder $y$, is arranged so as to bear against the rim for discharging the extruded material $x^1$ from the rim as the wheel rotates. A receiver $r$ is arranged so as to receive the extruded and discharged material. When the rim is thick as shown in Fig. 1, the apertures are preferably developed into conical, outwardly widening channels so that the extruded strings $x^1$ can pass through without much resistance.

The wheel is mounted on a shaft $a$ which is rotated so as to pass the molds, as described in the parent specification, through different operating positions. The mold $b$ is shown in Fig. 1 in the position in which it receives a butter portion $f$ of excessive weight from a stream whence the portion is severed. The mold $c$ is shown in the position in which the butter portion is pressed between two opposing press plungers so as to correct the shape and the weight of the portions, the materials not containable between the plungers being extruded through the apertures or channels $x$.

I claim:

A butter and like molding device comprising a wheel having a smooth rim, and a plurality of open-ended molds arranged within the rim of said wheel, said rim having apertures through which material can be extruded from the molds.

JOHANNES BENZ.